United States Patent Office 2,696,265
Patented Dec. 7, 1954

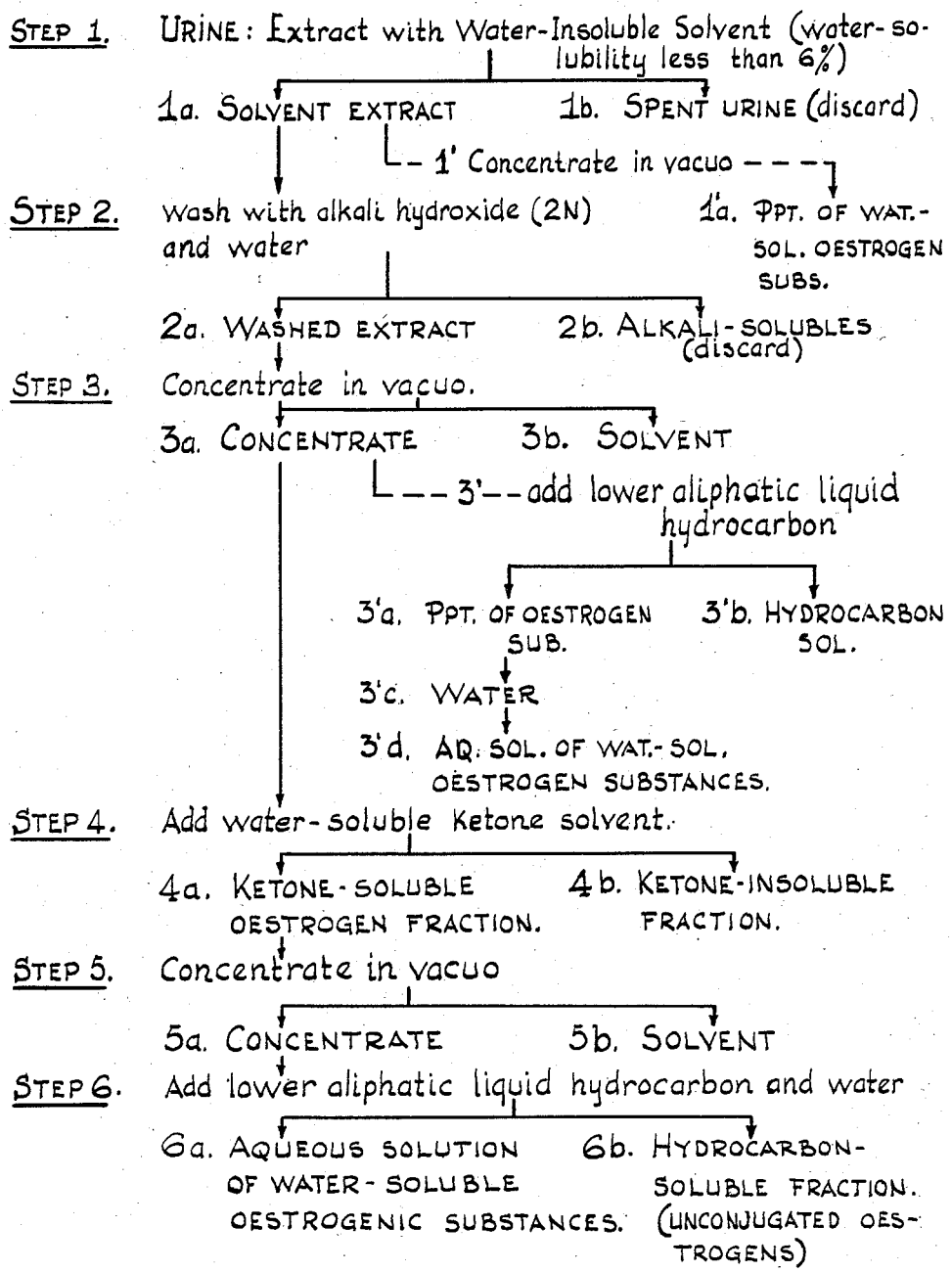

2,696,265

PREPARATION OF ESTROGENIC HORMONES

Desmond Beall, Westmount, Quebec, and Gordon A. Grant, Montreal, Quebec, Canada, assignors, by mesne assignments, to American Home Products Corporation, New York, N. Y., a corporation of Delaware Application December 11, 1948, Serial No. 64,834

10 Claims. (Cl. 167—74.5)

This invention relates to water-soluble estrogenically active substances derived from equine urine.

United States Patent No. 2,429,398 discloses such a product. This product is characterized by the fact that it contains substantially all of the water-soluble estrogenically orally active substances contained in unhydrolyzed equine urinary materials, is substantially soluble in water, substantially insoluble in benzol or ether; and has the ability to alleviate the menopausal syndrome in humans and to produce vaginal cornification in adult ovariectomized rats, is stable and therapeutically non-toxic.

The above patent describes the preparation of such a product by contacting equine urinary material which has not been substantially hydrolyzed, while maintaining conditions to prevent its substantial hydrolysis, with an agent effective to produce separation of a normally water-soluble fraction containing the water-soluble orally active estrogenic and stability imparting substances of equine urine, and removing the fraction from the agent under conditions to prevent substantial hydrolysis. The preferred method disclosed in the patent is by adsorption and elution.

The applicants have now discovered a process by which an orally effective estrogenic product can be derived but which has unexpectedly higher potency per unit of weight. The applicants' process involves the treatment of equine urinary material with a substantially water-insoluble organic solvent selected from the group consisting of alcohols and ketones having a water-solubility of less than 6%.

The products of the present invention are obtained from equine urinary material in a liquid, dried or concentrated form. The urinary material is preferably fresh or suitably preserved, for example, with chloroform and alcohol, to prevent hydrolysis. The urinary material is preferably that of pregnant mares or of stallions, with that of pregnant mares used by choice. The starting material may be raw urine or it may be urinary material which has been concentrated, for example, spray dried or partly purified. However, a great advantage of the process is being able to act directly on raw urine and achieve a maximum initial separation.

The preferred extraction solvents are hexanol, cyclohexanol, methylcyclohexanol, cyclohexanone or isophorone, with hexanol being used by choice.

This process is unexpectedly effective in freeing the active substances from the urine to the exclusion of estrogenically inert solids. In other words, the potency:solids extraction ratio is unexpectedly favourable. A precipitate which can be used therapeutically may be derived from the solvent extract by mere concentration, preferably in vacuo. The concentrate contains less than about 3% of the urinary solids accompanied by at least about 80% of the estrogenic potency. This concentrate can be used directly as a therapeutic product but the applicants prefer to process it further.

In one method of procedure the solvent extract, obtained by the above-mentioned solvent extraction with substantially water-insoluble solvent, is washed first with an alkali hydroxide (preferably 2 N) and then with water, thereby obtaining a washed extract from which large quantities of alkali-soluble substances have been removed. The washed extract is then concentrated in vacuo. There is thus obtained a concentrate from which most of the water-insoluble solvent has been removed. This concentrate may be treated to precipitate a fraction containing the water-soluble estrogenic substances. This may be done by adding to the concentrate a lower aliphatic liquid hydrocarbon, for example, hexane, pentane, or heptane, with hexane preferred. While this fraction can be used as a therapeutic agent the applicants prefer to process it further.

Alternatively, instead of precipitating the estrogenic activity with the lower aliphatic liquid hydrocarbon, the concentrate is mixed with a water-soluble ketone solvent, the ketone-insoluble fraction which precipitates and which is estrogenically inactive is discarded and the ketone-soluble fraction containing the activity concentrated in vacuo. Preferred ketones are acetone and methyl ethyl ketone.

Following the ketone treating step and the concentration in vacuo, there is added to the concentrate the liquid hydrocarbon solvent, in which the water-soluble estrogenic substances are insoluble, so as to form a solvent mixture. The preferred solvent as mentioned above, is hexane. The mixture is then extracted with water, whereby the water-soluble estrogenic substances pass into the aqueous phase and the solvent phase contains impurities and varying amounts of unconjugated estrogens which can be recovered.

The new product resulting from the complete process as above described contains the water-soluble estrogenically orally active substances contained in unhydrolyzed equine urinary materials, including the sulphates of estrone including equilin, equilenin, $\beta$-estradiol and $\beta$-dihydro-equilenin. Physically, the product is substantially soluble in water, in methyl alcohol or in acetone, insoluble in benzene, chloroform or ether, is stable and non-toxic and contains less than 1% of the original urinary solids. Physiologically, the product is effective to alleviate the menopausal syndrome in humans and produces vaginal cornification in adult ovariectomized rats. The product is effectively free from glycuronides, e. g. less than about 0.5% by weight.

The product may be further treated by washing as in application Serial No. 777,370, filed October 1, 1947, now Patent No. 2,551,205, with a water-insoluble organic solvent at a pH within the range of about 4 to about 6. The pH of the resulting solution is adjusted to slightly alkaline, and concentrated in vacuo. Preferred solvents are chlorinated hydrocarbons, particularly ethylene dichloride. Such a product will be substantially free from phenolic oils and odours.

The product of the present invention also contains essential stability factors effective to maintain the water-soluble estrogenic potency. It has also been found to contain not less than about 20% biologically active material expressed in terms of sodium estrone sulphate, and also to be substantially free from phenolic oils and from odours.

The invention will be understood in greater detail by reference to the following examples illustrating the preferred procedure and to the drawing. The drawing shows a flow sheet which represents a complete process together with a modification thereof.

EXAMPLE I 50 gallons of urine were extracted twice with a 10 gallon (⅕ vol.) portion of hexanol. 20 gallons of hexanol extract were thus obtained. This extract was washed with 20 liters of 2 N sodium hydroxide and separated with a Sharples centrifuge. The hexanol fraction was washed with 10 liters of water. The mixture was concentrated to 1 liter in a vacuum still to remove the greater portion of the hexanol. 5 liters of acetone were mixed with the estrogenic concentrate causing a precipitation of impurities. The mixture was centrifuged to separate the solids from the liquid effluent containing the potency. The centrifugate or effluent was concentrated to 1 liter in vacuo to remove substantially all of the acetone. 2 liters of hexane were added and the mixture was extracted once with 500 ml. of water and again with 250 ml. of water. The water solution contained the water-soluble estrogens. This estrogenic solution was lyophylized to give 86 grams of solids containing 20% sodium estrone sulphate as determined by the Kober test. The solids were dissolved in water and the solution adjusted to pH 4 with hydrochloric acid and washed twice with ethylene dichloride. The pH of the aqueous phase was adjusted to 8 with 1 N sodium hydroxide and the solution was concentrated to dryness. The residue weighed 72 grams. This gave a solid product containing 27% of water-soluble estrogens calculated in terms of sodium estrone sulphate as determined by bio-assay and Kober test.

The final material was found to contain traces of glycuronides. The nitrogen content was about 0.46%. The hydrolyzable sulphur was about 5.54%. The ash content was about 17.4%.

EXAMPLE II 700 ml. samples of late pregnancy urine were extracted with two portions of 140 ml. (⅕ volume) of the alcohols and ketones listed below. Separation was effected by centrifuging. Table I discloses the variation of solids extracted in each extraction and amounts of estrogens in the solids obtained by varying the solvents of the invention. It is clearly indicated from the results of the following tables that alcohols and ketones having a solubility of less than 6% in water have unexpected ability to selectively extract the water-soluble estrogenic potency from equine urinary material to the exclusion of inert material.

*Table I*

INITIAL EXTRACTIONS

| Solvent | 1st Extraction | | | 2nd Extraction | | | Combined | | | |
|---|---|---|---|---|---|---|---|---|---|---|
| | Solids, mg. | Kober, mg. | Percent estrogens extr. from urine | Solids, mg. | Kober, mg. | Percent residual estrogens extracted | Solids, mg. | Kober, mg. | Percent orig. potency | Percent estrogens in solids |
| Hexanol | 930 | 15 | 48 | 500 | 7.6 | 46 | 1,420 | 22.6 | 72 | 1.6 |
| Cyclohexanol | 1,400 | 17 | 54 | 1,300 | 7.0 | 48 | 2,700 | 24.0 | 76 | 0.9 |
| Methyl cyclohexanol (tech.) | 1,050 | 14 | 45 | 600 | 8.6 | 49 | 1,650 | 22.6 | 72 | 1.4 |
| Cyclohexanone | 625 | 10.6 | 38 | 630 | 6.6 | 34 | 1,280 | 18.2 | 59 | 1.4 |
| Isophorone | 850 | 16.4 | 56 | 360 | 5.6 | 40 | 1,210 | 23.0 | 74 | 1.9 |

The two extracts were combined and washed once with a ⅕ volume of 2 N NaOH and once with 1/10 vol. of water. Table II shows the loss in solids after washing the extracts and the amount of chromogenes in the final solids determined by the Kober method.

*Table II*

WASHED EXTRACTS

| Solvent | Initial | | Washed | | Percent losses | | Percent Kober in Final solids |
|---|---|---|---|---|---|---|---|
| | Solids, mg. | Kober, mg. | Solids | Kober | Solids | Kober | |
| Hexanol | 1,420 | 22.6 | 420 | 17.3 | 70 | 24 | 4.1 |
| Cyclohexanol | 2,700 | 24.0 | 1,400 | 20.0 | 50 | 17 | 1.4 |
| Methyl cyclohexanol | 1,650 | 22.6 | 420 | 15.9 | 75 | 30 | 3.8 |
| Cyclohexanone | 1,280 | 18.2 | 380 | 14.8 | 70 | 19 | 3.9 |
| Isophorone | 1,210 | 23.0 | 270 | 10.8 | 78 | 53 | 4.0 |

We claim:

1. In a process of obtaining an estrogenic therapeutic product, the steps of, extracting equine urinary material containing the water-soluble estrogenically orally active substances contained in substantially unhydrolyzed equine urine, with an organic solvent selected from the group consisting of very slightly soluble aliphatic alcohols and ketones having a water-solubility of less than 6% to cause separation of said orally active substances into the solvent, and removing said substances from the solvent to obtain a product containing estrogenic orally active substances.

2. A process according to claim 1, wherein the removal from the solvent is effected by concentrating in vacuo to obtain a precipitate.

3. A process according to claim 1, wherein the solvent extract is washed with an alkali hydroxide and water, and the washed extract concentrated in vacuo.

4. A process according to claim 3, wherein the concentrate obtained by concentration in vacuo is mixed with a water-soluble ketone solvent thereby causing precipitation of an inactive ketone-insoluble fraction, and recovering the ketone solvent soluble fraction containing the water-soluble estrogenic substances.

5. A process according to claim 3, wherein the concentrate obtained by concentration in vacuo is treated with a lower aliphatic liquid hydrocarbon to obtain a precipitate containing the water-soluble estrogenic substances.

6. The process of obtaining the water-soluble estrogenically orally active substances contained in equine urinary material, comprising, extracting substantially unhydrolyzed equine urinary material with an organic solvent selected from the group consisting of very slightly soluble aliphatic alcohols and ketones having a water-solubility of less than 6%, washing the extract with an alkali hydroxide and water to remove large quantities of alkali-soluble substances, concentrating in vacuo, treating the concentrate with a water-soluble ketone solvent thereby obtaining an extract of the active substances, concentrating said extract, adding a lower aliphatic liquid hydrocarbon and water to the concentrate thereby obtaining an aqueous fraction of the water-soluble estrogenic substances.

7. In a process of obtaining an estrogenic therapeutic product, the steps of, extracting equine urinary material containing the water-soluble estrogenically orally active substances contained in substantially unhydrolyzed equine urine, with a very slightly soluble aliphatic alcohol having a water-solubility of less than 6% to cause separation of said orally active substances into the solvent, and removing said substances from the solvent to obtain a product containing water-soluble estrogenic orally active substances.

8. In a process of obtaining an estrogenic therapeutic product, the steps of, extracting equine urinary material containing the water-soluble estrogenically orally active substances contained in substantially unhydrolyzed equine urine, with a very slightly soluble aliphatic ketone having a water-solubility of less than 6% to cause separation of said orally active substances into the solvent, and removing said substances from the solvent to obtain a product containing water-soluble estrogenic orally active substances.

9. In a process of obtaining an estrogenic therapeutic product, the steps of, extracting equine urinary material containing the water-soluble estrogenically orally active substances contained in substantially unhydrolyzed equine urine, with hexanol to cause separation of said orally active substances into the solvent, and removing said substances from the solvent to obtain a product containing water-soluble estrogenic orally active substances.

10. Process of extracting conjugated estrogens from gravid mare's urine comprising extracting gravid mare's urine with an alkyl carbinol having six carbon atoms and a very slight solubility of less than 6% and recovering the conjugated estrogens from the carbinol solution.

(References on following page)

References Cited in the file of this patent

UNITED STATES PATENTS

| Number | Name | Date |
|---|---|---|
| 2,429,398 | Cook | Oct. 21, 1947 |

FOREIGN PATENTS

| Number | Country | Date |
|---|---|---|
| 381,900 | Great Britain | Oct. 13, 1932 |

OTHER REFERENCES

New & Nonofficial Remedies, 1947, page 346.
"The Hormones," Pincus et al., vol. 1, pages 334 and 335, published 1948 by Academic Press Inc., N. Y. C.